US012701152B2

(12) United States Patent
Cassidy et al.

(10) Patent No.: US 12,701,152 B2
(45) Date of Patent: Aug. 4, 2026

(54) SYSTEMS AND METHODS FOR MEDIA CONTENT STREAMING

(71) Applicant: Super Hi-Fi, LLC, Los Angeles, CA (US)

(72) Inventors: Brendon Patrick Cassidy, Venice, CA (US); Pierre Nicholas Chanquion, London (GB); Mona I Fazwy, Mount Kisco, KY (US); Oskar Jozef Cieslik, Koteze (PL); Attinder Singh Khalsa, Sacramento, CA (US); Zack J Zalon, Sherman Oaks, CA (US)

(73) Assignee: Super Hi-Fi, LLC, Los Angeles, CA (US)

( * ) Notice: Subject to any disclaimer, the term of this patent is extended or adjusted under 35 U.S.C. 154(b) by 0 days.

(21) Appl. No.: 18/601,834

(22) Filed: Mar. 11, 2024

(65) Prior Publication Data
US 2025/0286919 A1      Sep. 11, 2025

(51) Int. Cl.
*H04L 65/612*      (2022.01)
(52) U.S. Cl.
CPC .................................. *H04L 65/612* (2022.05)
(58) Field of Classification Search
CPC ...................................................... H04L 65/612
See application file for complete search history.

(56) References Cited

U.S. PATENT DOCUMENTS

| | | | | |
|---|---|---|---|---|
| 5,243,513 | A * | 9/1993 | Peters ...................... | H03G 3/02 |
| | | | | 700/83 |
| 10,007,409 | B2 * | 6/2018 | Kim ....................... | G06F 16/433 |
| 2007/0294297 | A1 * | 12/2007 | Kesteloot ................ | G06F 16/64 |
| 2009/0044253 | A1 * | 2/2009 | Interlandi ............... | G06F 21/10 |
| | | | | 726/4 |
| 2011/0162018 | A1 * | 6/2011 | Dodd ............... | H04N 21/43622 |
| | | | | 725/78 |
| 2011/0164739 | A1 * | 7/2011 | Clark ................ | H04M 3/42017 |
| | | | | 379/142.04 |
| 2012/0262468 | A1 * | 10/2012 | Ronayne ................... | G09G 5/36 |
| | | | | 345/548 |
| 2012/0323776 | A1 * | 12/2012 | Van Vleck ......... | H04N 7/17318 |
| | | | | 705/40 |
| 2014/0115117 | A1 * | 4/2014 | Fiedler .................. | H04L 65/612 |
| | | | | 709/219 |

(Continued)

*Primary Examiner* — Richard G Keehn
(74) *Attorney, Agent, or Firm* — McDonnell Boehnen Hulbert & Berghoff LLP

(57) ABSTRACT

Example embodiments relate to systems and methods for mixing and delivering interactive audio and video experiences. The disclosed systems and methods could provide gapless audio and/or video streams that include high-quality song/content transitions with custom or semi-custom host/ DJ voice overs and professionally mixed portions. Described embodiments cross the divide between broadcast and interactive user experiences by employing a process that turns a media consumption session into a "choose your own adventure" experience for users. Instead of attempting to produce individual, per-user experiences in the cloud (which is cost-prohibitive), systems and methods described herein produce "one" canonical experience in the cloud. This canonical experience includes within it optionality that can be utilized to "stitch together" a given user's contiguous, interactive experience.

20 Claims, 3 Drawing Sheets

(56) References Cited

U.S. PATENT DOCUMENTS

| 2017/0200473 | A1* | 7/2017 | Moore | H04N 21/41407 |
| 2018/0129273 | A1* | 5/2018 | Thorwirth | H04L 65/612 |
| 2019/0342634 | A1* | 11/2019 | Folgner | H04N 21/4788 |
| 2020/0075031 | A1* | 3/2020 | You | H03G 9/005 |
| 2020/0234697 | A1* | 7/2020 | Webster | G10L 15/30 |
| 2020/0275130 | A1* | 8/2020 | Bokov | H04N 19/18 |
| 2024/0040167 | A1* | 2/2024 | Labrozzi | G06Q 30/0264 |

* cited by examiner

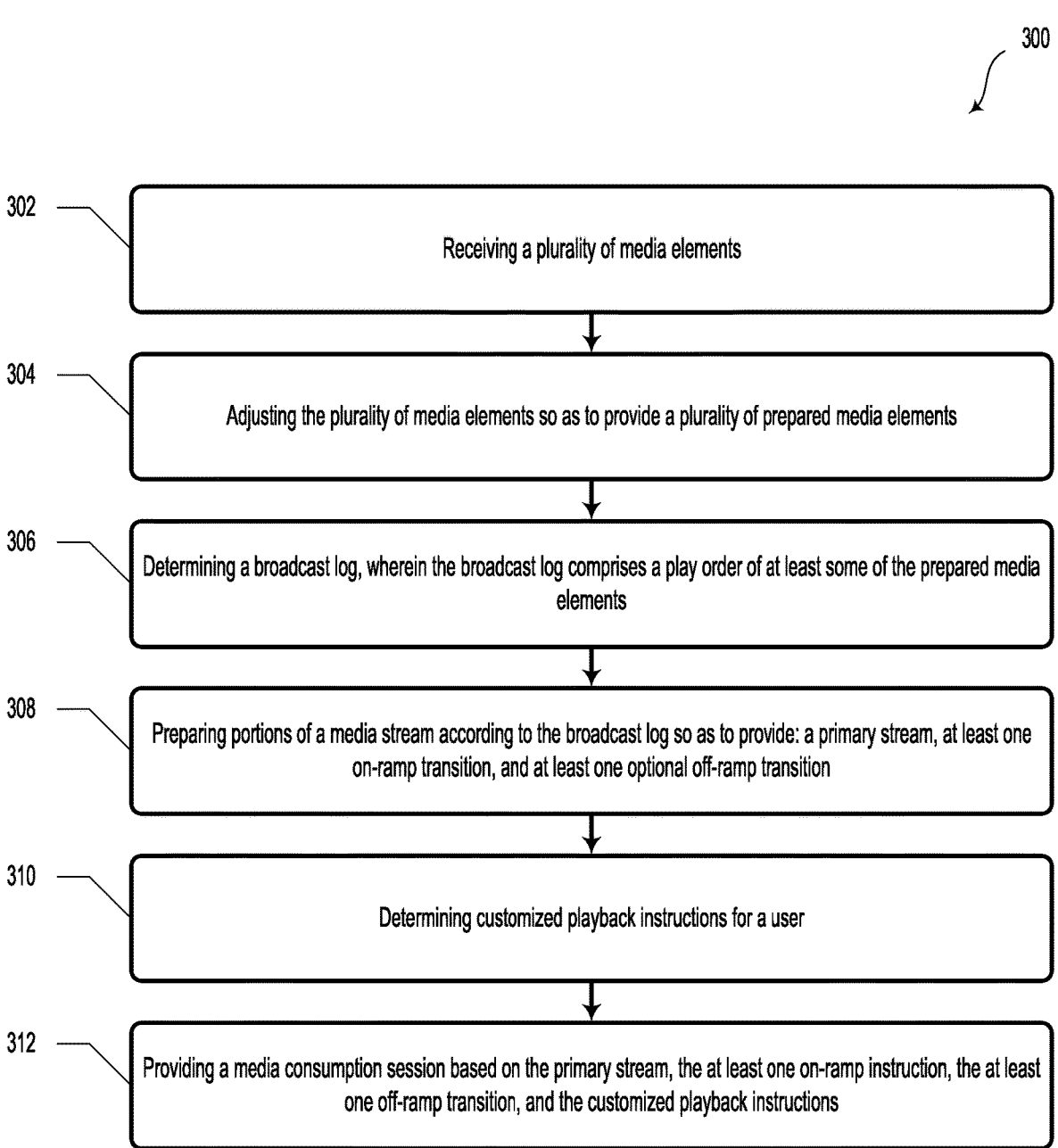

302 — Receiving a plurality of media elements

304 — Adjusting the plurality of media elements so as to provide a plurality of prepared media elements 306 — Determining a broadcast log, wherein the broadcast log comprises a play order of at least some of the prepared media elements 308 — Preparing portions of a media stream according to the broadcast log so as to provide: a primary stream, at least one on-ramp transition, and at least one optional off-ramp transition 310 — Determining customized playback instructions for a user 312 — Providing a media consumption session based on the primary stream, the at least one on-ramp instruction, the at least one off-ramp transition, and the customized playback instructions

Figure 3

SYSTEMS AND METHODS FOR MEDIA CONTENT STREAMING

BACKGROUND

In conventional streaming audio and video services, there are two main types of streaming experiences currently available to consumers.

A first media consumption experience mimics conventional broadcast radio and television, where individual content elements are artfully balanced, seamlessly transitioned between, and sometimes overlain with supportive content. This is termed a "broadcast" experience. It is akin to a live broadcast station where a user has no control over their position in the experience as they can only start and stop (or change station). If the experience is prerecorded or buffered, users can sometimes "seek" through the program material—though this is inelegant and jarring as they are usually dropped into the middle of pre-produced elements.

The second conventional media consumption experience mimics a more a la carte method, where individual content elements are played sequentially but have no overlap or transition between them. For example, this sort of experience could include a music service with a playlist on shuffle. This may be termed the "interactive" experience as users are sometimes able to control the sequencing in the experience itself by advancing through the content (e.g. skipping a song or video). When skipping, the current piece of content is stopped and the next content is started cleanly from its beginning.

Broadcast-like experiences are superior listening and/or viewing experiences that sacrifice interactivity for production quality. Interactive experiences allow users to engage with and control their content experience while completely sacrificing the quality and flow of a broadcast experience. However, having both interactivity and quality production at the same time is extremely challenging.

One way to provide a hybrid experience is to make the consumer's playback device the "production engine". In this circumstance, individual content elements are sent to the device along with instructions for how to produce and blend them. In such scenarios, it is the playback device's responsibility to perform the heavy computation that blends and transitions the audio and video. This sets a high bar for the capabilities of that device and taxes its compute performance, network connection, and battery life.

This type of computation heavy hybrid experience is not ideal for most circumstances. A user on-the-go using a mobile device with limited battery and network connectivity would quickly have their experience degraded or broken. A user with a low-cost smart speaker or smart television would be unable to perform the computational work necessary to render the proper experience.

One possible solution is to dedicate resources "in the cloud" to producing each individual user's content experience. The problems with this approach are several. The cost of doing so for a broadcast medium is enormously expensive (each listener would require their own production and streaming servers). Latency between the consumer's device and the hardware in the cloud doing the rendering (as well as the inherent latency in the various audio and/or video codecs used) also makes any interactivity feel extremely slow and unresponsive.

Accordingly, there is a need for systems and methods that can better bridge the gap between fully produced broadcast experiences and fully interactive unicast experiences whereby consumers can have both high quality production and the individualized control they expect over their engagement sessions. These systems and methods need to support the business reality around the costs of delivery as well as the limited capabilities of the receiving devices.

SUMMARY

Example embodiments relate to systems and methods for mixing and delivering audio-visual media content. In particular, a media consumption experience could be likened to a "choose your own adventure" book. In such a book, readers have points of decision where they can make choices and guide the story. The author populates the book with all of the various narrative pathways they wish to allow users to take. When reading, the reader only experiences the portion of the book that supports the choices that they made.

A stream that embodies this spirit could also be likened to a person driving along an interstate highway. Just as such a roadway could include on-ramps, off-ramps, bypasses, and interchanges, the media consumption experience could include similar moments of interaction that allow the listener to gracefully join the stream, leave the stream, route around content, and transition to another stream entirely.

In a first aspect, a media streaming system is provided. The media streaming system includes a controller having at least one processor and a memory. The at least one processor executes program instructions stored in the memory so as to carry out operations. The operations include receiving a plurality of media elements and adjusting the plurality of media elements so as to provide a plurality of prepared media elements. The operations also include determining a broadcast log that includes a play order of at least some of the prepared media elements. The operations also include preparing portions of a media stream according to the broadcast log so as to provide a primary stream, at least one on-ramp transition, and at least one optional off-ramp transition. The operations further include determining customized playback instructions for a user and providing a media consumption session based on the primary stream, the at least one on-ramp instruction, the at least one optional off-ramp transition, and the customized playback instructions.

In a second aspect, a method is provided. The method includes receiving a plurality of media elements and adjusting the plurality of media elements so as to provide a plurality of prepared media elements. The method yet further includes determining a broadcast log that includes a play order of at least some of the prepared media elements. The method also includes preparing portions of a media stream according to the broadcast log so as to provide a primary stream, at least one on-ramp transition, and at least one optional off-ramp transition. The method yet further includes determining customized playback instructions for a user and providing a media consumption session based on the primary stream, the at least one on-ramp instruction, the at least one off-ramp transition, and the customized playback instructions.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 3 illustrates a method, according to an example embodiment.

DETAILED DESCRIPTION

Figure 1:
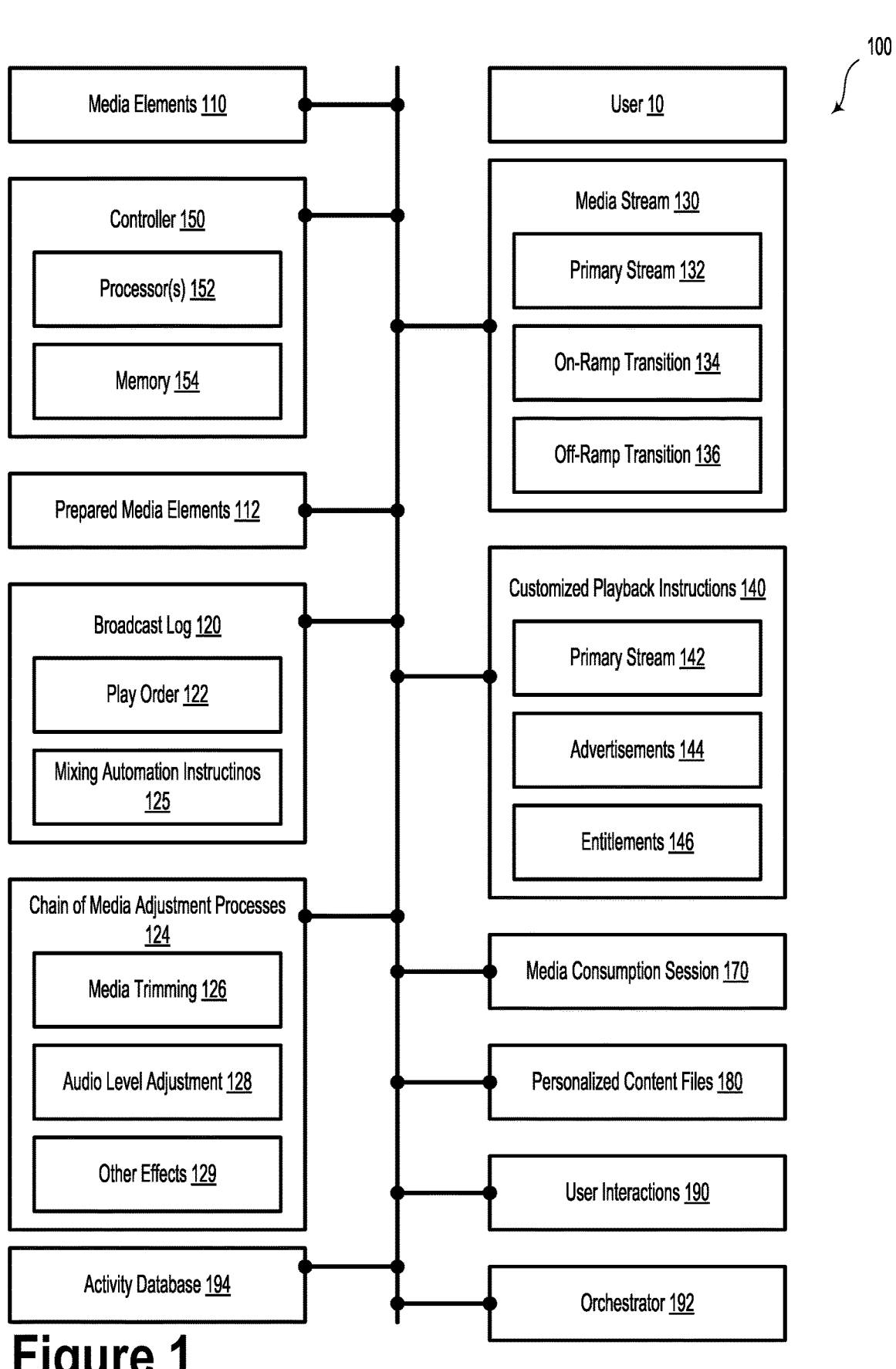
FIG. 1 illustrates a media streaming system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The present disclosure relates to systems and methods for media streaming to a playback client. In particular, the disclosed systems and methods could provide gapless audio and/or video streams that include high-quality song/content transitions with custom or semi-custom host voice overs and professionally mixed portions. Described systems and methods cross the divide between broadcast and interactive user experiences by employing a process that turns a media consumption session into a "choose your own adventure" experience for users. Instead of attempting to produce individual, per-user experiences in the cloud (which is cost-prohibitive), systems and methods described herein produce "one" canonical experience in the cloud. This canonical experience includes within it optionality that can be utilized to "stitch together" a given user's contiguous, interactive experience.

Additionally, systems and methods described herein beneficially improve the logistics and economics of live broadcasting by substantially reducing the amount of video and/or audio that needs to be mixed, processed, encoded, and delivered. In reference to an audio-only radio experience, for traditional radio stations, a small collection of music (300-600 songs) are intelligently shuffled so as to create the feeling of variety within the context of a relatively fixed set of audio song content. Some songs will play back quite frequently (e.g. every 2 hours) on hit-based radio stations. With traditional live broadcasting, all songs play back in full through the mixing, processing, and encoding chain each time they recur.

The presently described systems and methods recognize that the only things that change when songs play back are the beginnings and endings of songs or other types of media content where they overlap with adjacent songs and production elements. Instead of redundantly processing the entire piece of media each time the media plays, the systems and methods described herein only mix, process, and encode the overlapping portions. For the non-novel segments, a pre-processed version of the "middle" portion of each song in question is leveraged. This optimization produces a significant order-of-magnitude reduction in the mixing, processing, and encoding required for each hour of broadcast. This work can also be done in parallel, further optimizing the resources required to create the broadcast stream.

The best way to imagine an experience provided by the presently described systems and methods is as an interstate freeway system. Without interaction from a driver, a given vehicle proceeds forward on a predefined path that is filled with spaced-out rest areas, billboards, and scenic views. The civil engineers that designed the freeway system also provided drivers with optionality in the form of off-ramps, on-ramps, bypasses, and interchanges. This allows drivers and their passengers to, at certain points: 1) leave the freeway; 2) join (or rejoin) the freeway; 3) take a bypass that circumvents a portion of the freeway; and 4) leave the current freeway altogether to travel on a different freeway.

Like the civil engineers in the above-described analogy, the preparation services that are a part of the presently described systems and methods create a similar construct: an audio or audio/video stream full of seamless on-ramps, off-ramps, bypasses, and interchanges. These moments of choice generally occur within proximity of the beginning of the next content element in the stream, which may be termed "transitions".

On-Ramps

On-ramps allow the user to join and rejoin a stream gracefully. The closest on-ramp is identified for a user based on their position relative to the absolute program time. Each transition, any number of on-ramps can be leveraged based on how the experience is configured.

For example, the "clean content start" onramp is commonly used when a user initially presses play. This clean content start begins the song without any additional video/audio and then imperceptibly transitions into the fully-produced stream. It behaves like an interactive playback experience but immediately transforms into one that is fully-produced.

Another example is a "content assisted entry" where one or more pieces of additional content are played prior to, and/or over, the opening of the song subsequent to the user pressing play. This could include, for example, a radio DJ talking over the song's introduction and/or playing a fully produced jingle that seamlessly transitions into the song's opening. This technique is commonly used when returning from personalized advertising breaks.

Off-Ramps

Off-ramps allow the user to leave a streaming experience gracefully. Depending on the use case, users can either signal that they would like to take an off-ramp or a piece of programmatic logic can decide it is time for a user to take the off-ramp (e.g. it is time to leave the stream and play a block of personalized advertisements for this user). Like on-ramps, a plurality of off-ramps can be prepared based on various scenarios required based on a given viewing/listening use case.

An off-ramp can exist without additional production elements. In such a scenario, a user is taken seamlessly to the original ending of the current piece of content and, after playing out the piece of content in full, any number of actions can be taken. This includes simply stopping the experience, playing some personalized content, or taking an on-ramp to another experience (e.g. a different radio station altogether).

Most commonly, the off-ramp can contain production elements when needed. These production elements can be fully produced interstitials, host/DJ voice tracks, sound effects that function as "sweepers" to shorten long fades on the outgoing song, and any combination thereof. Selection of which ones to produce for a given transition can be based on configuration and/or context (e.g. what is appropriate for this given moment in time given the outgoing song and its audio characteristics at the end).

Bypasses

A bypass allows users to move forward (and backward, if allowed) in the experience. For example, a user presses the "skip" button to advance forward in the program material, bypassing some percentage of the current song. The provided video/audio information immediately responds by stopping the currently playing back item and then the user takes the on-ramp to the next song in the experience. The whole experience is clean, just like it would be for an interactive use case. By leveraging the surrounding on-ramps, the presently-described systems and methods are able to allow for temporal manipulation without the messy inaccuracy of seeking to positions in the stream that may be imprecise and/or contain other overlapping elements.

Interchanges

Like with freeways, an interchange smoothly moves a user from one experience to another. For example, a given stream could branch into a number of substreams that segment the listeners based on a preference. Perhaps each could play a different song by an artist that is regionally relevant to that branch's listeners, and then rejoin the main stream when done. Another example is that a user may be moved from one radio station to another without even noticing.

The presently described systems and methods include two types of interchanges: seamless interchanges and discontinuous interchanges. Seamless interchanges allow for content to be continuously overlapping without any pause in the program material. The branching example above can leverage seamless interchanges when the stream bifurcates into the various regional pathways.

Discontinuous interchanges leverage specific on-ramps and off-ramps to switch from one content stream to another. This moment of silence can be incredibly brief (measured in milliseconds), but does require all sound to cease in order to avoid harsh discontinuities in the audio/video signal. This type of interchange is also the most flexible, allowing users to be taken from anywhere to anywhere.

As an example of the usefulness of discontinuous interchanges, a stream could be marked to transport users to a different stream altogether at a specific time using a produced off-ramp. This stream could be a live, non-interactive experience that is emanating from one or more broadcast locations. At a certain point in that experience, an "orchestrator" (described more fully below) can be signaled to return the listeners to the first stream by means of an on-ramp. This way, an experience can have portions that are interactive and portions that are live seamlessly interwoven with only the briefest, subsecond gap at the cutover points.

Relation to Other Media Streaming Methods

The user experience described above could be provided in two ways: 1) as a series of encoded, gapless video or audio files; or 2) as an HTTP Live Streaming (HLS) stream with enhanced interactivity or "HLS+". Generally, the gapless method is considered a specialty output format because it requires the playback hardware to support gapless playback of successive files. Without such hardware, there can be an audible hiccup every time the listener switches from one file to another. Not all consumer audio playback hardware supports this method.

Gapless streams must also be delivered in a format that also supports gapless playback of varying-length successive video or audio files. Example formats that support gapless playback include M4A AAC audio and FLAC. For lossy-compression formats, the files essentially have a few values included within them that specify how much audio to trim from the beginning and end of the file after decoding so as to remove any gaps of silence that are added by the encoding process.

Finally, the gapless playback client needs a mechanism to retrieve, synchronize, and update the ordered list of files to stream. For example, for Sonos devices, they support the Sonos CloudQueue API that performs this duty. This API would be leveraged by the Orchestrator to connect the appropriate segments to create the user's chosen listening experience as they interact or passively listen.

The HLS method is the most widely supported output method for the presently described methods and systems. This implementation leverages the HLS specification for the delivery of audio and video experiences. In this format, the audio and/or video is prepared and packaged into TS files (Transport Stream files).

In both gapless and HLS methods, a virtual map is stored in a database that indicates how the files are constructed, what is a part of the primary stream, and where are all of the on-ramps, off-ramps, and interchanges.

When playing back one of these experiences, the prepared file looks like a typical HLS stream to the playback client. The actual frames of audio and video being served are specific to that user's journey through the experience and delivered via M3U8 playlists from the disclosure's "Orchestrator Service" (described below). Most (if not all) devices or software capable of playing HLS can render the experience non-interactively.

Users can be granted interactive control of the experience using either device-supported interaction methods (like the aforementioned CloudQueue) or by running a small amount of additional code on the client to capture and provide the requested user actions to the Orchestrator. Messages delivered down through the playlist not only provide metadata, but also signal what behaviors are possible. For example, if a service allows users to skip a fixed number of times per hour, the additional metadata will contain their currently available skip count. When a client retrieves the upcoming HLS playlist data, it can also pass interaction messages to the Orchestrator (for example, using a query string, other URL modification, or by adding to the request's headers).

II. Example Media Streaming Systems

FIG. 1 illustrates a media streaming system 100, according to an example embodiment. The media streaming system 100 includes a controller 150 having at least one processor 152 and a memory 154. The controller 150 may be configured to interact with various components of a computing device, such as input/output devices, storage devices, and network interfaces.

In some embodiments, the controller 150 may include various interfaces and protocols for communicating with other devices and systems. For example, the controller 150 may support various wireless and wired communication protocols, such as Wi-Fi, Bluetooth, Ethernet, and USB. In some examples, the controller 150 may be communicatively coupled to a communication interface. The communication interface could include one or more of: ethernet, USB, HDMI, Wi-Fi, Bluetooth, near field communication (NFC), Zigbee, and/or cellular communication interfaces.

In some embodiments, the controller 150 may be implemented as a standalone device or integrated into a larger computing system or device, such as a mobile device, a server, or a cloud-based computing platform.

The controller 150 may be programmed and configured using various software tools and programming languages. For example, the controller 150 may be programmed using a high-level programming language such as Java or Python, or using a low-level programming language such as assembly language. Alternatively, the controller 150 may be programmed based on other system programming languages such as Rust, C, and/or C++. It will be understood that other programming languages are possible and contemplated.

With the scope of the present disclosure, the memory 154 may include one or more computer-readable storage media such as hard disk drives (HDD), solid-state drives (SSD), flash drive, memory card, CD, DVD, magnetic tape, and/or random access memory (RAM). Other types of storage media are possible and contemplated.

In some embodiments, the at least one processor 152 may include one or more specialized processing units, such as graphics processing units (GPUs) or digital signal processors (DSPs), to perform specific types of processing tasks. As an example, the at least one processor 152 could include a Texas Instruments TMS320, an Analog Devices SHARC, a Qualcomm Hexagon, an NXP Semiconductors i.MX series processor, an STMicroelectronics STM32 series processor, or a Xilinx Zynq series processor, among other possibilities. The at least one processor 152 could be specifically configured to perform functions such as audio signal filtering (e.g., filtering out noise and unwanted frequencies), signal compression (e.g., compress digital signals to reduce their size for efficient transmission and storage), signal modulation and demodulation (e.g., modulate and demodulate signals in wireless communication systems), signal equalization (e.g., equalize signals to compensate for attenuation and distortion that occur during transmission), signal analysis (e.g., analyze signals to extract information, such as speech recognition, image analysis, or fault diagnosis), and/or signal synthesis (e.g., synthesize signals, such as audio or video signals, for multimedia applications).

In other examples, the at least one processor 152 could include field programmable gate arrays (FPGAs), application-specific integrated circuits (ASICs), microcontrollers, or system on a chip (SOC). The at least one processor 152 executes program instructions stored in the memory 154 so as to carry out operations.

In example embodiments, the operations include receiving a plurality of media elements 110. As an example, the media elements 110 could include video content/clips, audio content/tracks, or transitions, among other types of media. Additionally or alternatively, the media elements 110 could include information enabling applications such as live streaming and cloud gaming among other possibilities.

The operations also include adjusting the plurality of media elements 110 so as to provide a plurality of prepared media elements 112.

The first step in enabling an experience to take advantage of the present disclosure is to ensure that all longer-form material (e.g., songs in the case of a radio-like stream or video content in the case of a video stream) and any "personalized" material that is leveraged outside of the primary stream has been pre-prepared for this style of delivery. This may include, but need not be limited to audio/video trimming: should any material need to be removed from the asset (e.g. a portion at the beginning or end not intended to ever play for content consumers).

The adjustments may also include gain normalization. Gain normalization may include that the audio levels of assets are analyzed and adjusted to maintain a consistent average amplitude throughout the media consumption session.

In some examples, adjustments may also include audio processing: a configurable chain of audio processes that are applied to the stream to give it a more broadcast sound. This may include modules such as brickwall limiters, multiband compressors, single-band compressors, equalizers, waveshaping transformers, frequency resynthesizers, and/or stereo field manipulators.

In various embodiments, the adjustments may include delivery encoding and packaging. For example, the adjustments may include creating versions of the audio/video asset at the various codecs and bitrates that are to be offered to the users (e.g., HE-AAC at 64 k and AAC-LC at 256 k).

A benefit that increases the efficiency of HLS+ is the fact that for the majority of the longer content items (e.g. songs), media content only needs to be prepared and encoded once. This is possible because of the precise time control over the mixed down transitions and on/off-ramps. In other words, for each encoded and packaged output format, information about the packaging itself is stored in a database so as to enable its usage without further inspection in later steps. This preparation can be performed well in advance (e.g. when a song enters a radio station's music library) or in a just-in-time fashion (e.g. when a user gets scheduled a personalized ad to play in their next advertising break).

Additionally or alternatively, content items that overlap or overlay the primary, longer form assets need not be preprepared (e.g. video clips, voice tracks, and/or produced interstitials). Only items that will be played without being mixed (for part or all of the item) need this preparation. This is what allows for the massive reduction in effort for stream generation as the bulk of the processing and encoding for any live stream was performed once, in-advance of the content's first airing.

The operations further include determining a broadcast log 120. The broadcast log 120 includes a play order 122 of at least some of the prepared media elements 112.

In various example embodiments, the broadcast log 120 could be hand-created or curated, algorithmically-generated, and/or any combination thereof. The broadcast log 120 includes the order that everything is to play and all of the mixing automation instructions (including, but not limited to, when to play each item; at what volume; where in the item to start and end; any volume adjustments over time that are to be performed; and what bus to output the audio to, etc.). The broadcast log 120 also includes specific mixing instructions for all produced on-ramps and off-ramps.

The operations yet further include preparing portions of a media stream 130 according to the broadcast log 120 so as to provide a primary stream 132, at least one on-ramp transition 134, and at least one optional off-ramp transition 136.

In various examples, preparing and assembling the various portions of the media stream 130 may include combining the primary stream with any produced on-ramps and off-ramps. For each transition, several actions may be performed. For example, preparing the transitions may include gathering needed audio or visual source data. In such scenarios, assets that are included in the transition area are identified and retrieved for inclusion in the mixed output.

In some embodiments, the preparation of media stream 130 may include quantization of the mixing automation instructions. This ensures that the incoming long-form element (usually a song or a video) is sample-aligned to an MPEG audio frame. While the quantization process involves a minute adjustment in terms of milliseconds, this enables for inaudible movement from newly created transitions and the originally-prepared asset files. In some examples, metadata information may also be quantized so as to offset scheduled playtimes based on an amount of quantization applied at a given transition.

In example embodiments, this is made possible by adjusting the mix instructions that come out of a trained artificial intelligence (AI) model to ensure that the incoming long content element (song or video) is "frame-aligned" to the previous file's frame start code. Another way to think about this is that we quantize the entry of the next long element (song) to a whole MPEG frame.

In a simplified example, consider that a particular audio encoding has a frame size of 2,048 samples. Under the present system and method, adjacent songs or videos can be aligned so that their frames are in sync. In practice, a subtle adjustment can be made to the AI's output with regard to a placement of an incoming element so that it is frame aligned to the prior element. This adjustment is so slight that it is, for all intents and purposes, imperceptible (measured in milliseconds). By aligning these frames, a transition element can be optionally merged with the pre-encoded asset when the transition is complete without audible/visual problems.

In various examples, preparation of the media stream 130 could include forming, modifying, and/or augmenting metadata in an ID3 layer of the transport stream (TS) and in a human-readable JSON in the m3u8 EXTINF tags. In such scenarios, the metadata could include information about scheduled playtimes, media information (e.g., digital rights management information), on-ramp transition or off-ramp transition information, as well as play duration, among other possibilities. It will be understood that, in some scenarios, the metadata need not be human readable or in JSON. For example, the metadata could include a Base64 format, which encodes binary information into a specific set of 64 characters (letters, digits, and selected symbols). Additionally or alternatively, other metadata formats such as XML are possible and contemplated.

In example embodiments, the preparation of the media stream 130 may additionally include mixing of a transition segment following the mixing automation instructions. This adjustment is performed for the primary stream and for any on-ramp or off-ramps that are scheduled at that transition moment. The automation instructions can be derived from: human-entered points on the two pieces of content, features extracted from the content using DSP and AI analysis methods, behaviors from an AI trained to mimic characteristic behaviors of a human DJ (in the case of music), or all of the above.

Additionally or alternatively, the preparation of media stream 130 could include processing of the transition segments. In some examples, this adjustment may include the same settings that were leveraged during the asset preparation phase to provide the plurality of prepared media elements 112. In various examples, processing the transition segments could include forming and/or modifying Audio Data Transport Stream (ADTS) information associated with the transitions. For example, the ADTS information could be added or modified with respect to AAC or other media files. The ADTS frame information makes it possible to transmit media streams that can be decoded in real-time by a receiver.

The ADTS information includes an ADTS header that precedes each frame of AAC data. The ADTS header may provide information to enable decoding the media content, such as the frame length, which is crucial for synchronization and error detection. In such scenarios, each ADTS frame may be described as [HEADER][DATA]. So an ADTS stream may be represented as [HEADER_1] [DATA_1] . . . [HEADER_N−1][DATA_N−1].

In some examples, preparing the media stream 130 could include encoding and packaging the audio/video content. This adjustment may include converting the mixed-down PCM audio data into the stream-appropriate codec, bitrate, and packaging (e.g. the gapless files required for the gapless method or the TS files used for HLS+).

Preparing the media stream 130 could also include remuxing the pre-prepared audio/video. Remuxing the pre-prepared audio/video could include that for HLS+ outputs, the service leverages the files from the asset preparation step to perform a "copy and modify procedure" to adjust the TS file's internal timecode and continuity counters. This process enables seamless connection of pre-prepared audio and newly created mixdown segments (e.g. the primary stream's transition and any on-ramps and off-ramps).

Additionally or alternatively, preparing the media stream 130 could include a processing stage termed "sequencing" where the timecode and/or continuity counter time differences are precalculated and stored prior to encoding. In such scenarios, the timing/continuity information may be calculated for all video clips, audio tracks, and transitions in a sequential batch. The timing/continuity information may then be utilized as starting positions when encoding. As such, modification of encoded assets is not needed because the timing/continuity information is attached to the media content when first encoded as an HLS TS.

As part of the encoding process, the sequence of media content may be segmented or divided into smaller, manageable segments or chunks for easier delivery over the internet. Conventional HLS muxers may attempt to group frames together into M3U8 segments so as to consistently approximate the playlist's target duration. However, in the present disclosure, segmentation of the media content may be performed using a set of heuristic algorithms. Furthermore, the segmentation parameters may be based on several factors, including the playlist's target duration, positions at which another video clip/audio track/transition may be "spliced in" and positions at which metadata content needs to change. In various examples, the present system and methods perform segmentation while also guaranteeing the 1s minimum segment size required by the HLS specification.

When preparing the various pathways in the stream (e.g. the stream transition, an on-ramp transition, and/or an off-ramp transition), it is possible (and likely) that a combination of an on-ramp and off-ramp would be longer than the stream transition itself. This is accommodated by allowing the on-ramp and the off-ramp's timecode and continuity counters to overlap. Since there will be at least one discontinuity placed between the off-ramp transition and on-ramp transition, timecode continuity between them is not required. This discontinuity allows the off-ramp to stretch forward in time as much as is necessary from the point where it left the primary stream. It also allows the on-ramp to stretch backwards in time as much as is necessary from the point where it re-joins the primary stream. It will be understood that other ways to manipulate the respective transition timecodes are possible and contemplated so as to enable the presently described systems and methods.

In some embodiments, "smart packaging" may be performed so as to collect data into HLS-compliant segments. This smart packaging is important when handling transitions. Conventionally, HLS streams have a consistent size for their segments. Six seconds, for example, is a common setting for this. This works when dealing with live 24/7 encoding or pre-encoding an entire experience.

However, to provide an interactive live experience, it can be that transition segments can be of any length and unlikely to break evenly into a fixed segment size. For example, if a given transition is 13 seconds long, such a duration does not divide evenly into two six second segments; a second will be left over. Systems and methods described herein take advantage of the fact that HLS does support some variance in the segment size. In utilizing this, two main approaches can be taken.

First, in some examples, an approach may include increasing all segments during the transition slightly to capture the remainder. The example above would have two six and a half second segments.

Second, an alternative approach could be to divide the video/audio into differently sized segments, all under the target segment size plus half a second. For example, the example above could be broken into segments of five, four, and four seconds (or variants thereof).

However, in various examples, some segments may have slight variations in frame size. In such scenarios, the sequencer could utilize a combination of both of the above approaches.

In various embodiments, preparing the media stream 130 may additionally include delivery of the various media assets to a Content Delivery Network (CDN). This step places the audio and/or video assets onto the platform's geographically distributed network of proxy servers and data centers so that the media assets can be delivered to content consumers when playing back the stream and its associated pathways.

In some examples, preparing the media stream 130 could include a population of playback data tables. In this step, details germane to creating the playback instructions for the user's client (e.g the M3U8 file for HLS+) are stored in a database in a known, compact format that can be quickly retrieved, deserialized, and used for the user's listening/viewing experience.

The operations additionally include determining customized playback instructions 140 for a user 10.

The operations also include providing a media consumption session 170 based on the primary stream 132, the at least one on-ramp instruction 134, the at least one optional off-ramp transition 136, and the customized playback instructions 140.

In some examples, the media streaming system 100 may carry out the operation of adjusting the plurality of media elements 110 by optionally trimming at least a portion of at least one media element 110.

In various examples, adjusting the plurality of media elements 110 could include determining audio levels for each media element of the plurality of media elements 110 and adjusting a respective gain level for each media element so as to maintain a constant average amplitude. Other audio level adjustments 128 are possible and contemplated.

Among various embodiments, adjusting the plurality of media elements 110 could include applying a chain of media adjustment processes 124 to the plurality of media elements 110.

In some example embodiments, the chain of media adjustment processes 124 could include at least one of: a brickwall limiter, a multiband compressor, a single-band compressor, an equalizer, a waveshaping transformer, a frequency resynthesizer, or a stereo field manipulator. It will be understood that other media adjustment techniques, methods, and/or hardware may be utilized or otherwise employed within the scope of the present disclosure.

In various examples, the broadcast log 120 could include mixing automation instructions 125. In such scenarios, the mixing automation instructions 125 could include at least one of a playback volume level for each prepared media element 112, a playback starting point for each prepared media element 112, a playback ending point for each prepared media element 112, a volume adjustment over time, a media output selection, or mixing instructions for each transition (e.g., on-ramp transition 134 and/or off-ramp transition 136) between the prepared media elements 112.

In some embodiments, the operation of determining the customized playback instructions 140 could include at least one of: managing the media consumption session 170 so as to ensure contiguous playback of the prepared media elements 112, planning and scheduling advertisements 144 and/or managing skip allocations or other entitlements 146. It will be understood that other types of customized playback instructions 140 are possible and contemplated.

Example embodiments include that the operation of determining the customized playback instructions 140 includes receiving information indicative of user interactions 190 and adjusting the media consumption session 170 based on the user interactions 190.

In various embodiments, the operation of determining the customized playback instructions 140 could include navigating among the portions of the media stream based on the user interactions 190.

Yet further, some embodiments may include that the operation of determining the customized playback instructions 140 includes incorporating personalized content files 180 into the media consumption session 170. In such scenarios, the personalized content files 180 could include at least one of: advertisements, weather updates, news briefs, sports segments, or other types of personalized audio and/or video elements.

Orchestrator

Described systems and methods may include an orchestrator 192. In such scenarios, the orchestrator 192 has a relationship with each user and interprets their interactions, the configuration of the stream they are engaging with, and the various stream-specific pathways contained in the platform's Playback Data Tables. The orchestrator 192 combines all of this information into specific playback instructions (e.g., customized playback instructions 140) for each user.

The following activities include some of the functions of what the orchestrator 192 performs in order to coordinate the user's individual experience:

Session Management: using either a persistent payload (e.g. a browser cookie) or a database-backed session store, the orchestrator 192 keeps track of each user's session in order to ensure contiguous playback of the media segments, track and respond to interactions, plan and schedule advertisements, and manage entitlements (e.g. skip allocations), among other possibilities.

Stream Pathfinding: based on configuration, interactions, and allowances, the orchestrator 192 navigates the user through the various stream segments, on-ramps, off-ramps, personalized content files (e.g. advertisements, weather, etc.), and other elements.

Personalization: the orchestrator 192 can also be configured to include personalized elements for a user such as advertising breaks, local weather forecasts, selected content elements (e.g. a news brief or sports segment), and other audio and/or visual elements that target the specific user in question.

Metadata Signaling: providing playback clients with details about the current and upcoming playback items for the purpose of user-display.

Reporting: when a user plays a portion of a piece of content, the orchestrator 192 also writes that action to an activity database 194. This data can then be collected and turned into the vital reports that are necessary to support the usage. These include, but are not limited to: rights and royalties reports for the various performing rights organizations (e.g. in music use cases, Sound Exchange, ASCAP, BMI, SESAC, etc.); advertising impressions (e.g. using the VAST XML format to identify the necessary impressions to fire when playing an ad); and other experiential measures (e.g. how and when are users skipping content).

Calls to the orchestrator 192 for the gapless method are less frequent than that of HLS+. Clients call to refill their playlist when they need more material to play. There are generally only three gapless segments per content item: the beginning portion, the middle portion, and the end portion. Long periods of time can be covered by those three segments. For example, a user listening to a music streaming experience could be served 12 segments which cover 16 minutes of play time (4 songs times 4 minutes per song).

For the HLS delivery method, per the HLS protocol, the client communicates with the orchestrator 192 twice per audio segment. In the case of audio that is delivered in twelve second segments, for example, the client will call the orchestrator every six seconds. Efficiency and scalability are critical for a service that receives this much traffic per user.

In some examples, the pre-encoded asset may be altered slightly with respect to the time at which the asset begins playback. In such scenarios, systems and methods described herein could include an adjustment of timecode and continuity counters for all audio and video content (e.g., both pre-encoded full-length content items and the newly produced transitions+ramps).

For HLS, one of the requirements is that, within a transport stream, continuity counters and timestamps MUST be sequential. These values ensure that playback devices are able to verify that they are getting contiguous, synchronized audio, video, and other elements (e.g. captions). However, within the context of the present disclosure, when re-using previously prepared and encoded assets, a very quick confirmation must be performed to ensure that the timecode and continuity counters match with a potential transition segment. This confirmation is performed by copying over the encoded media data and re-writing the timestamps and the continuity counters into new files. These files are designed to only play at that specific point in the media stream. This confirmation and timestamp rewriting process is highly efficient when compared to re-processing and re-encoding entire media content files and transitions.

In some embodiments, specific timestamp information about the media stream can be stored in a data repository so that rapid pathfinding can be performed by the orchestrator 192. In such scenarios, when a stream is prepared for delivery, all of the audio/video assets (as described above) may be placed onto a CDN for delivery to content consumers. These assets are the "heavy" assets from a file size perspective. In order for a client to play these assets, the CDN needs to provide them with the segment-by-segment playlist for the portion of the stream they are trying to play. This playlist is formed, modified, and handled by the orchestrator 192.

Because a given media stream involves a lot of segments (e.g. every six seconds or some other segment size), the stored information could include segment information, metadata associated with each segment, as well as any of the optionality (e.g. segments for on-ramps, off-ramps, etc. as well as the positions where users can leave and join the primary stream). This information needs to be stored hyper-efficiently and be able to be retrieved quickly from the shared database.

Example queries come from media players, at a rate potential equal to or greater than half the segment size (e.g. every three seconds for a six second segment size). For each request, every user needs to be returned to the contiguous regions of the segment playlist that correspond to where they are in the experience. In such scenarios, the database needs to be optimized so that the relevant information can be retrieved rapidly and efficiently for each user. One or more of the following techniques can be utilized to enable this:

Complex Key Structures and indexing that makes finding a range of time for a stream trivial to return without time consuming queries.

Compression of playlist data to store ultra-compact versions of the payload that can be re-expanded by the orchestrator in the playlist that it outputs.

Passing of robust stream positioning information between the client and server to ensure the continuity of the returns from the orchestrator.

Use of opportunistic client-level caching of shared playlist data to reduce database reads.

Each of these aspects beneficially allows the systems and methods to operate at scale in an affordable manner.

In some embodiments, the orchestrator 192 could provide tracking information for reporting content consumption information for a given media consumption session 170. For example, when delivering segments to users and working to track their position in the content, the orchestrator 192 could track media consumption behavior within one half of the segment size (e.g., three second resolution). This reporting information can be utilized to track what streams are being listened to and what content items have received plays. This, in turn, can be used to generate royalty reporting for rights organizations.

Figure 2:
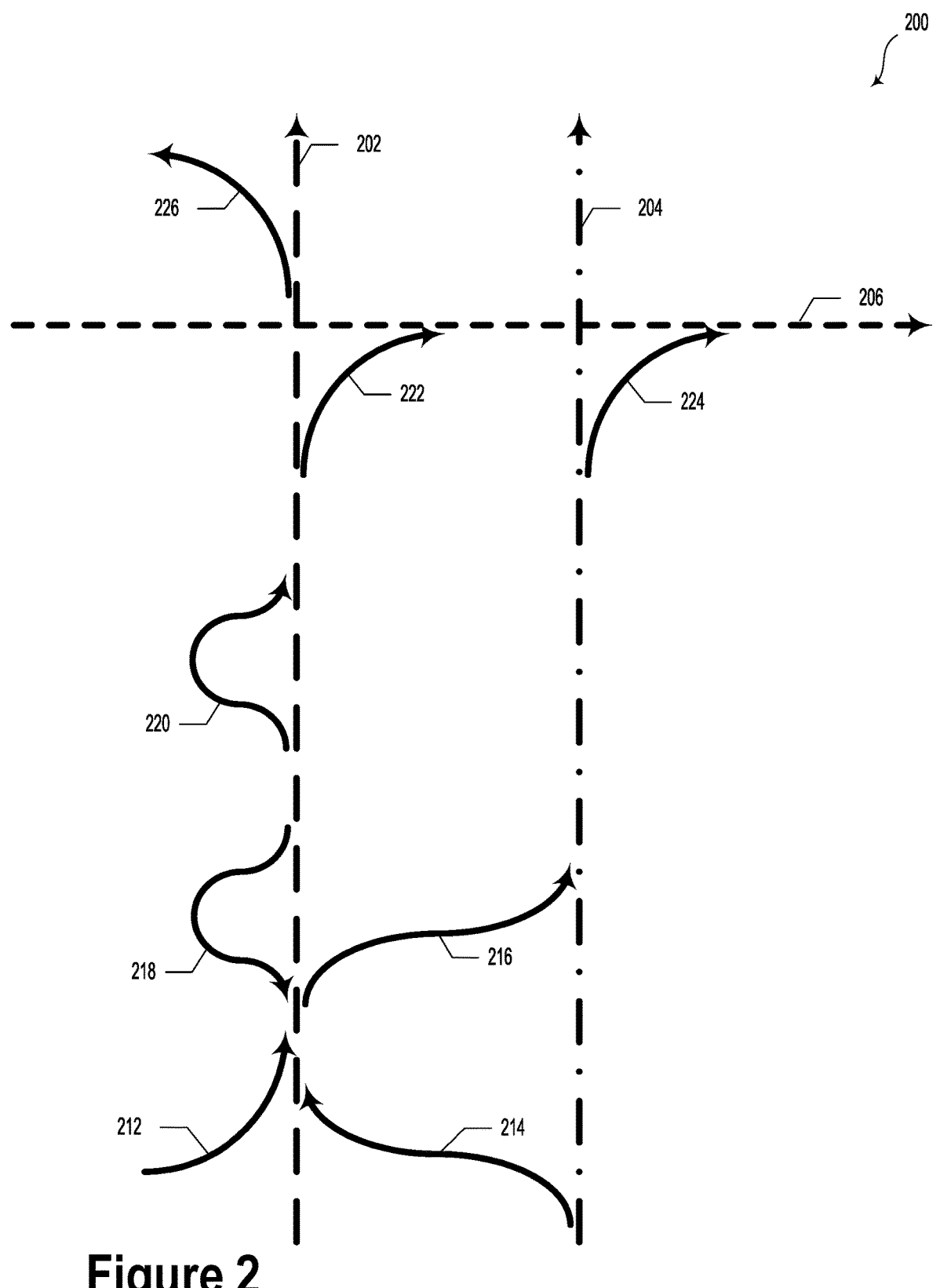
FIG. 2 illustrates a media streaming scenario, according to an example embodiment.

FIG. 2 illustrates media streaming scenario 200, according to an example embodiment. The media streaming scenario 200 could include a primary media stream 202, a second media stream 204, and a third media stream 206. The primary media stream 202, the second media stream 204, and/or the third media stream 206 could include video and/or audio content. The audio content could include, for example, music, podcasts, radio-style broadcasts, and audiobooks. Examples of video content could include, without limitation, movies, television shows, long- or short-form video recordings, vlogs, tutorials, reviews, and/or live broadcasts (e.g., real-time video broadcasts of events, gaming, live Q&As, or daily activities). The audio/video content could more generally include shows (e.g., fictional narratives produced for entertainment, ranging from short films to feature-length movies and episodic TV series), documentaries (e.g., non-fictional content aiming to inform or educate viewers about real-world subjects, from nature to history), educational content (e.g., audio/visual content designed to educate, such as online courses, how-to guides, and educational channels), news and journalism (e.g., audio/video content focusing on current events, news stories, and investigative journalism), animation (e.g., traditional and computer-generated animation for entertainment or educational purposes, ranging from cartoons to animated feature films), sports and fitness (e.g., audio/video content relating to live sports events, sports analysis, workout guides, and fitness routines), virtual reality (VR) and 360-degree videos (e.g., immersive video content that allows viewers to control the viewing direction or experience content in a simulated 3D environment).

As an example, a media content consumer could choose on-ramp transition 212 to gracefully "merge" into the primary media stream 202. The transition could include a gradual volume increase to avoid abrupt changes in loudness for the listener/viewer and/or a visual fade-in effect (e.g., fade from black, fade from white, fade from existing content, etc.).

The media streaming scenario 200 may also include various options for other types of transitions while a user 10 is consuming content. For example, the user 10 may choose a skip-back transition 218, which may include skipping back some length of time (e.g., 5 seconds, 10 seconds, 30 seconds, or more) within the primary media stream 202.

Additionally or alternatively, the user 10 may choose a skip-ahead transition 220. The skip-ahead transition could adjust the user's experience by skipping ahead some length of time (e.g., 5 seconds, 10 seconds, 30 seconds, or more) within the primary media stream 202. It will be understood that skip-ahead transitions and skip-back transitions are possible with respect to the second media stream 204 and/or the third media stream 206.

Other types of transitions could include "off-ramps", which transition a user experience from an initial media stream to another stream or to end the media a stream-switching transition 216 from the primary media stream 202 to the second media stream 204. Additionally or alternatively, the other transitions in scenario 200 could include stream-switching transition 222 (e.g., to switch from the primary media stream 202 to the third media stream 206), stream-switching transition 214 (e.g., to switch from the second media stream 204 to the primary media stream 202), and/or stream-switching transition 224 (e.g., to switch from the second media stream 204 to the third media stream 206).

What follows is a summary of events that occur during an orchestrator session. Not all of the described steps are necessary for every deployment. Instead, the following example provides a specific real-world example of how the product could be used.

A streaming session begins when a listener is routed to the HLS+ services. This activity is performed by beginning a session by calling the master url (which delivers the master.m3u8 playlist to the listener). An orchestrator (e.g., orchestrator 192) works by behaving like URLs for text playlists, but provides a full application in practice. Rather than reading a fixed playlist off of a CDN, each listener/viewer is interacting with the application to create their unique pathway through the media consumption experience.

There are two ways that the media consumer can be routed into the content service: from an Interactive-Capable Client or from a Non-Interactive Client. Interactive Capable Clients are playback clients that are pre-configured to inter-operate with HLS+ so as to enable interactive control for the listener (e.g. skip, go back, etc.). These clients still use HLS as the primary transport layer, but a combination of specific headers, cookies, and query string parameters enable the orchestrator to respond to their requests for interaction.

Non-Interactive clients simply play back the HLS stream without any additional interactive commands. As per the HLS specification, there is a HTTP cookie that travels to and from the service and the client that helps maintain their state and position in the stream. This stream could get routed through a pathway of on-ramps, off-ramps, interchanges, and bypasses in order to create a specific user experience, but the user will have no direct control over the "route" taken.

Setting Interactive vs. Non-Interactive mode could include a basic query string in the master.m3u8 url. This query string can indicate the presence of interactive support. For example, http://hlsplus.org/this_awesome_stream/master.m3u8?i=0 indicates a zero for the "i" parameter, which signals a lack of interactive capability.

For both types of clients, additional metadata can be delivered as a part of the original request that aids in identifying the particular listener for session state, advertising targeting, personalization, and other implementation-specific details that aids in generating the proper experience for them as an individual.

The orchestrator then identifies the particular stream to place the user in and where to begin their experience. In some cases, the user is starting a fresh session and can enter the stream at the beginning of the closest content element (e.g. it is 1:48 PM and the Orchestrator identifies that the closest content start was at 1:47 PM and begins that item for the user). In other cases the user may be resuming an active session that they previously had paused. In that case, the Orchestrator will allow the user to begin exactly where they left off.

The Orchestrator is able to do this because it maintains a session state for the user. The session state may be stored or maintained in a server-side database or, in other examples, encrypted and compressed into a cookie that is exchanged between the client and server on every request. This session state can store information about a current user listening/viewing timestamp within a given stream. The system state may also store information about allowable interactions (e.g. what skips have been used and if and when they can return), the aforementioned "additional metadata" that can be used for advertising and other personalization, and any upcoming interactions (e.g. take a produced off-ramp after the current content item and play these advertisements).

The primary job of the Orchestrator is to provide playback clients with the upcoming audio and video segments that they are to play in the appropriate order. By leveraging the session state as well as additional playback sequence information that can optionally be passed in interactive mode, the Orchestrator can look up the exact position in the stream for each user from an optimized datastore and return the appropriate upcoming segments.

Like a "choose your own adventure" book, the datastore contains all of the possible pathways that a user's experience may take. The Orchestrator skillfully assembles the specific sequence of media for a user based on how the experience is configured, any interactions performed by the user, and any other time or event-dispensed events that are active (for example, leaving the stream every 15 minutes for a personalized ad break).

Secondarily, the Orchestrator can record events for the user in a reporting database for later analysis and use. This allows for the creation of metrics for each stream to measure the popularity over time. It also enables recording user interactions and correlating them to content items or other situations (for the later purpose of driving the programming and sequencing either for that user or all users in aggregate). It can additionally be used to identify fraudulent listening patterns.

These recorded events can also be leveraged to build out performance reports for performing rights organizations (e.g. for music, Sound Exchange, ASCAP, BMI, SESAC, etc.). Generally, those reports are views of the content that was played and how many plays occurred over a certain period of time. Other styles of reports can be delivered to partners or content owners as per the terms of each individual relationship. For instance, a partner may wish for a CSV file to be delivered with all user events for their own internal purposes.

Another use of this reporting database is the storing of the various impression URLs taken from the user's advertising events (e.g. as specified in the VAST response). A service can then perform these impressions on behalf of the listener.

The Orchestrator writes the data in an efficient manner so that other services can make use of the information in business-critical ways. This has the benefit of moving reporting and impression-calling responsibilities out of the Orchestrator for performance reasons (keeping the Orchestrator service itself lightweight and hyper-targeted at its primary purpose).

A user's session may end when they elect (e.g. by pressing stop or disconnecting their device), or it may end when the Orchestrator decides to end it (e.g. after a specific amount of time or at the end of the program material). Additionally, errors such as a device falling off of its network connection, running out of batteries, being turned off, or crashing may also cease a playback session.

III. Example Methods

FIG. 3 illustrates a method 300, according to an example embodiment. While method 300 illustrates several blocks of an example method, it will be understood that more blocks or steps could be included. In such scenarios, at least some of the various blocks or steps may be carried out in a different order than of that presented herein. Furthermore, blocks or steps may be added, subtracted, transposed, and/or repeated. Some or all of the blocks or steps of method 300 may be carried out by controller 150, as illustrated and described in reference to FIG. 1 and/or other computing devices.

Block 302 includes receiving a plurality of media elements (e.g., media elements 110).

Block 304 includes adjusting the plurality of media elements so as to provide a plurality of prepared media elements (e.g., prepared media elements 112). In some embodiments, adjusting the plurality of media elements could include trimming at least a portion of at least one media element (e.g., media trimming 126), determining audio levels for each media element of the plurality of media elements (e.g., audio level adjustment 128), adjusting a respective gain level for each media element of the plurality of media elements so as to maintain a constant average amplitude, and applying a chain of media adjustment processes (e.g., chain of media adjustment processes 124) to the plurality of media elements.

In some embodiments, the chain of media adjustment processes comprises at least one of: a brickwall limiter, a multiband compressor, a single-band compressor, an equalizer, a waveshaping transformer, a frequency resynthesizer, or a stereo field manipulator.

Block 306 includes determining a broadcast log (e.g., broadcast log 120). The broadcast log includes a play order (e.g., play order 122) of at least some of the prepared media elements. In some embodiments, the broadcast log may also include mixing automation instructions (e.g., mixing automation instructions 125). Additionally or alternatively, the broadcast log need not include mixing automation instructions. However, in such scenarios, the mixing engine can call to a service which will provide those instructions as needed.

In various embodiments, the mixing automation instructions could include at least one of: a playback volume level for each prepared media element, a playback starting point for each prepared media element, a playback ending point for each prepared media element, a volume adjustment over time, a media output selection, or mixing instructions for each transition between the prepared media elements. It will be understood that while certain examples described herein include audio use cases, other types of use cases, such as video-related experiences are also considered and possible. In such scenarios, video-related mixing automation instructions could include, for example, adjusting the brightness of the video over time (fade-in or out), applying overlays (e.g. station identifications or content ratings, etc.), or other more artistic video transitions (wipes, rolls, etc.). Other types of video transitions and effects are possible and contemplated.

Block 308 includes preparing portions of a media stream (e.g., media stream 130) according to the broadcast log so as to provide: a primary stream (e.g., primary stream 132), at least one on-ramp transition (e.g., on-ramp transition 134), and at least one optional off-ramp transition (e.g., off-ramp transition 136).

Block 310 includes determining customized playback instructions (e.g., customized playback instructions 140) for a user (e.g., user 10). In such scenarios, determining the customized playback instructions could include at least one of: managing the media consumption session so as to ensure contiguous playback of the prepared media elements, planning and scheduling advertisements (e.g., advertisements 144), or managing skip allocations or other entitlements (e.g., entitlements 146).

Additionally or alternatively, determining the customized playback instructions could include receiving information indicative of user interactions (e.g., user interactions 190) and adjusting the media consumption session based on the user interactions. In various examples, determining the customized playback instructions could include navigating among the portions of the media stream based on the user interactions.

In some examples, determining the customized playback instructions could include incorporating personalized content files (e.g., personalized content files 180) into the media consumption session. The personalized content files include at least one of: advertisements, weather updates, news briefs, sports segments, or personalized audio and/or video elements. Various embodiments may include that determining the customized playback instructions could include providing playback clients with information indicative of at least one of: current playback items or upcoming playback items.

In various embodiments, determining the customized playback instructions could include reporting, in an activity database, information indicative of media elements played during the media consumption session.

Block 312 includes providing a media consumption session (e.g., media consumption session 170) based on the primary stream, the at least one on-ramp instruction, the at least one off-ramp transition, and the customized playback instructions.

Example Playback Session

The following example describes a streaming music experience using the present systems and methods. It is designed to illustrate one example implementation of the disclosure, but should not be considered limiting to other expressions because other embodiments are possible and contemplated. Certain aspects of the streaming music experience may also vary based on the configuration of an experience or the needs of the technical integration. Also, as described elsewhere herein, other types of streaming media experiences, such as streaming video, are possible and contemplated within the scope of the present disclosure.

Initially, a user (e.g., user 10) opens a music streaming application on their phone and selects an interactive stream powered by the presently described systems (e.g., media streaming system 100) and methods (e.g., method 300).

The application calls the Orchestrator (e.g., orchestrator 192) and provides it with information about the user for the purpose of targeting advertisement and/or personalized content.

The Orchestrator optionally validates that the user is allowed to experience the selected stream.

The Orchestrator then retrieves information about the closest song start (e.g. one minute ago) and begins assembling a HLS M3U8 playlist to deliver to the user. It includes an original on-ramp (the song's unaltered beginning portion) and then transitions that user into the primary stream.

Time goes by and the client plays the stream without interacting. The client calls the Orchestrator regularly in order to keep its playlist up-to-date. The combination of the session state (delivered in a cookie in this implementation) and a continuity value passed as a query string parameter on each playlist request helps ensure that the Orchestrator delivers a contiguous experience.

Additionally, the Orchestrator continuously updates the reporting database (e.g., activity database 194) when the client calls to track their playback activity and allows other services to perform business-critical operations on that data.

To play audio, the client is streaming the media files from a Content Delivery Network (CDN) as referenced in the M3U8 playlist gaplessly as per the instructions from the Orchestrator.

Additionally, the playback client responds to both the ID3 tags contained within the stream and the supplemental metadata provided in the M3U8 playlist to display the appropriate Now Playing information for the listener.

After a certain period of playback (e.g. 12 minutes), the orchestrator decides that after the current song the user should play an advertising break. This particular stream and/or user could be configured to play up to four advertisements per break. The Orchestrator calls an Ad Serving Service and, using the personalization information, requests the ads for the specific user. This service responds and the ads are stored in the user's session state.

If the system has seen the advertisements before, this is all that needs to be done. If not, and if the ad vendor didn't provide the appropriate HLS playlist data, the Orchestrator can signal to an asynchronous service to go retrieve and prepare the advertisement for the user.

This preparation service, if needed, downloads and optionally volume-levels, trims, and transcodes the asset into the formats needed for insertion into the stream. The preparation service can do this very efficiently and have the advertisement ready for play in a matter of seconds. Once it has prepared an ad, all of the relevant details are stored in a database and CDN so it doesn't have to process that ad again and other listeners can use the resulting data and asset.

When the listener reaches the position of the off-ramp in the stream, the Orchestrator leaves the main stream and delivers a produced off-ramp that contains additional sonic elements (e.g. sweepers and/or branding) and comes to a clean, definitive end.

At this point, the Orchestrator inserts the playlist data for the four advertisements sequentially. The ads are merged into the M3U8 playlist in a manner that is customary for HLS ad insertion (as per the HLS specification). It will be understood that other ways to incorporate advertisements into the primary stream are possible and contemplated.

Additional data is passed to the reporting service when each ad plays. This includes any impression URLs that need to be triggered on behalf of the user.

When the ads are complete, the Orchestrator uses a produced on-ramp which plays some branding and overlaps into the beginning of the next song. After the on-ramp is complete, the user is merged into the primary stream.

After playing a while longer, the user can decide to skip the current song. Their application has seen in the metadata delivered by the Orchestrator that they have available skips and therefore the playback client has left the skip button active.

When the user clicks the skip button, playback is stopped and the Orchestrator is immediately called for a playlist update. This call also contains some extra information that indicates the user has requested a skip. While there are a number of ways to send this signal, this implementation simply appends a query string to the url with the parameter "?s=1".

The Orchestrator validates that the user has the ability to skip (per the business rules and count of available skips). The Orchestrator does this successfully and advances the user to the next song in the experience. The Orchestrator sends the original on-ramp of the song in the user's playlist and then merges them back into the primary stream. The skip is recorded in their session state and the metadata passing to the user decrements the available skip count (e.g. from six to five).

The listening session can continue indefinitely. Additionally or alternatively, the listening session could be ended by the user. Ending the listening session could include, for example, transitioning to end-stream content, and/or a volume level fade out.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A media streaming system, comprising:
a controller having at least one processor and a memory, wherein the at least one processor executes program instructions stored in the memory so as to carry out operations, the operations comprising:
receiving a plurality of media elements;
adjusting the plurality of media elements so as to provide a plurality of prepared media elements;
determining a broadcast log, wherein the broadcast log comprises a play order of at least some of the prepared media elements;
preparing portions of a media stream according to the broadcast log so as to provide:
a primary stream;
at least one on-ramp transition; and
at least one optional off-ramp transition,
wherein preparing portions of the media stream comprises quantization of mixing automation instructions as generated by an artificial intelligence model;
determining customized playback instructions for a user; and
providing a media consumption session based on the primary stream, the at least one on- ramp transition, the at least one optional off-ramp transition, and the customized playback instructions.

2. The media streaming system of claim 1, wherein the operation of adjusting the plurality of media elements comprises:
optionally trimming at least a portion of at least one media element;
determining audio levels for each media element of the plurality of media elements;
adjusting a respective gain level for each media element of the plurality of media elements so as to maintain a constant average amplitude; and
applying a chain of media adjustment processes to the plurality of media elements.

3. The media streaming system of claim 2, wherein the chain of media adjustment processes comprises at least one of: a brickwall limiter, a multiband compressor, a single-band compressor, an equalizer, a waveshaping transformer, a frequency resynthesizer, or a stereo field manipulator.

4. The media streaming system of claim 1, wherein the broadcast log further comprises mixing automation instructions.

5. The media streaming system of claim 4, wherein mixing automation instructions comprise at least one of:
a playback volume level for each prepared media element;
a playback starting point for each prepared media element;
a playback ending point for each prepared media element;
a volume adjustment over time;
a media output selection; or mixing instructions for each transition between the prepared media elements.

6. The media streaming system of claim 1, wherein the operation of determining the customized playback instructions comprises at least one of:
managing the media consumption session so as to ensure contiguous playback of the prepared media elements;
planning and scheduling advertisements; or
managing skip allocations or other entitlements.

7. The media streaming system of claim 1, wherein the operation of determining the customized playback instructions comprises:
receiving information indicative of user interactions; and
adjusting the media consumption session based on the user interactions.

8. The media streaming system of claim 7, wherein the operation of determining the customized playback instructions comprises navigating among the portions of the media stream based on the user interactions.

9. The media streaming system of claim 7, wherein the operation of determining the customized playback instructions comprises incorporating personalized content files into the media consumption session, wherein the personalized content files comprise at least one of:
advertisements, weather updates, news briefs, sports segments, or personalized audio and/or video elements.

10. A method comprising:
receiving a plurality of media elements;
adjusting the plurality of media elements so as to provide a plurality of prepared media elements;
determining a broadcast log, wherein the broadcast log comprises a play order of at least some of the prepared media elements;
preparing portions of a media stream according to the broadcast log so as to provide:
a primary stream;
at least one on-ramp transition; and
at least one optional off-ramp transition;
wherein preparing portions of the media stream comprises quantization of mixing automation instructions as generated by an artificial intelligence model;
determining customized playback instructions for a user; and
providing a media consumption session based on the primary stream, the at least one on- ramp transition, the at least one off-ramp transition, and the customized playback instructions.

11. The method of claim 10, wherein adjusting the plurality of media elements comprises:
trimming at least a portion of at least one media element;
determining audio levels for each media element of the plurality of media elements;
adjusting a respective gain level for each media element of the plurality of media elements so as to maintain a constant average amplitude; and
applying a chain of media adjustment processes to the plurality of media elements.

12. The method of claim 11, wherein the chain of media adjustment processes comprises at least one of: a brickwall limiter, a multiband compressor, a single-band compressor, an equalizer, a waveshaping transformer, a frequency resynthesizer, or a stereo field manipulator.

13. The method of claim 10, wherein the broadcast log further comprises mixing automation instructions.

14. The method of claim 13, wherein the mixing automation instructions comprise at least one of:
a playback volume level for each prepared media element;

a playback starting point for each prepared media element;

a playback ending point for each prepared media element;

a volume adjustment over time;

a media output selection; or mixing instructions for each transition between the prepared media elements.

15. The method of claim 10, wherein determining the customized playback instructions comprises at least one of:

managing the media consumption session so as to ensure contiguous playback of the prepared media elements;

planning and scheduling advertisements; or managing skip allocations or other entitlements.

16. The method of claim 10, wherein determining the customized playback instructions comprises:

receiving information indicative of user interactions; and adjusting the media consumption session based on the user interactions.

17. The method of claim 16, wherein determining the customized playback instructions comprise navigating among the portions of the media stream based on the user interactions.

18. The method of claim 16, wherein determining the customized playback instructions comprises incorporating personalized content files into the media consumption session, wherein the personalized content files comprise at least one of: advertisements, weather updates, news briefs, sports segments, or personalized audio and/or video elements.

19. The method of claim 10, wherein determining the customized playback instructions comprises:

providing playback clients with information indicative of at least one of: current playback items or upcoming playback items.

20. The method of claim 10, wherein determining the customized playback instructions comprises:

reporting, in an activity database, information indicative of media elements played during the media consumption session.

* * * * *